US011434332B2

(12) United States Patent
Nam et al.

(10) Patent No.: US 11,434,332 B2
(45) Date of Patent: Sep. 6, 2022

(54) SUPER ABSORBENT POLYMER AND METHOD FOR PRODUCING SAME

(71) Applicant: LG Chem, Ltd., Seoul (KR)

(72) Inventors: Dae Woo Nam, Daejeon (KR); Seon Jung Jung, Daejeon (KR); Tae Hwan Jang, Daejeon (KR); Jun Kyu Kim, Daejeon (KR); Seong Beom Heo, Daejeon (KR); Bo Hyun Seong, Daejeon (KR); Yeon Woo Hong, Daejeon (KR); Su Jin Kim, Daejeon (KR); Ji Yoon Jeong, Daejeon (KR); Hyung Ki Yoon, Daejeon (KR)

(73) Assignee: LG Chem, Ltd.

( * ) Notice: Subject to any disclaimer, the term of this patent is extended or adjusted under 35 U.S.C. 154(b) by 699 days.

(21) Appl. No.: 16/087,197

(22) PCT Filed: Dec. 28, 2016

(86) PCT No.: PCT/KR2016/015412
§ 371 (c)(1),
(2) Date: Sep. 21, 2018

(87) PCT Pub. No.: WO2018/110757
PCT Pub. Date: Jun. 21, 2018

(65) Prior Publication Data
US 2019/0100629 A1 Apr. 4, 2019

(30) Foreign Application Priority Data

Dec. 13, 2016 (KR) .......................... 10-2016-0169386

(51) Int. Cl.
| | | |
|---|---|---|
| *C08J 3/075* | (2006.01) | |
| *C08J 3/12* | (2006.01) | |
| *C08J 3/24* | (2006.01) | |
| *C08K 5/42* | (2006.01) | |
| *C08F 22/02* | (2006.01) | |
| *B01J 20/26* | (2006.01) | |
| *C08L 33/00* | (2006.01) | |

(52) U.S. Cl.
CPC ............ *C08J 3/075* (2013.01); *B01J 20/267* (2013.01); *C08F 22/02* (2013.01); *C08J 3/12* (2013.01); *C08J 3/24* (2013.01); *C08J 3/245* (2013.01); *C08K 5/42* (2013.01); *C08L 33/00* (2013.01); *B01J 2220/68* (2013.01); *C08J 2300/14* (2013.01); *C08J 2333/00* (2013.01); *C08J 2333/02* (2013.01)

(58) Field of Classification Search
CPC ... B01J 20/267; C08J 3/075; C08J 3/12; C08J 3/24; C08J 3/245; C08F 22/02; C08K 5/42; C08L 33/00
See application file for complete search history.

(56) References Cited

U.S. PATENT DOCUMENTS

| | | |
|---|---|---|
| 5,180,804 A | 1/1993 | Niessner et al. |
| 5,563,218 A | 10/1996 | Rebre et al. |
| 2006/0089611 A1* | 4/2006 | Herfert ................... A61L 15/60 604/367 |
| 2008/0075937 A1 | 3/2008 | Wada et al. |
| 2009/0023848 A1 | 1/2009 | Ahmed et al. |
| 2010/0286287 A1 | 11/2010 | Walden |
| 2011/0118114 A1* | 5/2011 | Riegel .................... A61L 15/42 502/401 |
| 2012/0083411 A1 | 4/2012 | Ahmed et al. |
| 2012/0258851 A1 | 10/2012 | Nakatsuru et al. |
| 2014/0193641 A1 | 7/2014 | Torii et al. |
| 2016/0272745 A1* | 9/2016 | Daniel ................. C08F 220/06 |
| 2016/0280825 A1 | 9/2016 | Bauer et al. |
| 2016/0367717 A1 | 12/2016 | Hinayama et al. |
| 2017/0066862 A1 | 3/2017 | Matsumoto et al. |
| 2018/0050321 A1* | 2/2018 | Lee ........................ B01J 20/265 |
| 2018/0056274 A1* | 3/2018 | Lee ........................ B01J 20/261 |

FOREIGN PATENT DOCUMENTS

| | | |
|---|---|---|
| EP | 0615736 A1 | 9/1994 |
| EP | 0644211 A1 | 3/1995 |
| EP | 1637105 A1 | 3/2006 |
| EP | 2116571 A1 | 11/2009 |
| EP | 1730218 B1 | 12/2010 |
| EP | 2797566 B1 | 6/2019 |
| JP | 1903038 B2 | 3/2012 |
| JP | 2013522403 A | 6/2013 |
| KR | 100876827 B1 | 1/2009 |
| KR | 20100040858 A | 4/2010 |
| KR | 20100105832 A | 9/2010 |
| KR | 20120081113 A | 7/2012 |
| KR | 20120132475 A | 12/2012 |
| KR | 20140038998 A | 3/2014 |
| KR | 101474229 B1 | 12/2014 |
| KR | 20150068321 A | 6/2015 |
| KR | 101543484 B1 | 8/2015 |
| KR | 20160017650 A | 2/2016 |
| KR | 20160079834 A | 7/2016 |
| KR | 20160128350 A | 11/2016 |
| KR | 20160141666 A | 12/2016 |
| WO | 2011113728 A1 | 9/2011 |
| WO | 2013144027 A1 | 10/2013 |

OTHER PUBLICATIONS

Extended European Search Report including Written Opinion for Application No. EP16923780.7 dated Mar. 6, 2019.
Third Party Observation for Application No. PCT/KR2016/015412 dated Apr. 5, 2019.
International Search Report for Application No. PCT/KR2016/015412, dated Sep. 11, 2017.
(Continued)

*Primary Examiner* — Yong L Chu
(74) *Attorney, Agent, or Firm* — Lerner, David, Littenberg, Krumholz & Mentlik, LLP

(57) ABSTRACT

A super absorbent polymer according to the present invention has an excellent discoloration resistance characteristic even under high temperature/high humidity conditions, while maintaining excellent absorption performance, and is preferably used for hygienic materials such as diapers, and thus can exhibit excellent performance.

8 Claims, No Drawings

(56) References Cited

OTHER PUBLICATIONS

Odian, George, "Principles of Polymerization", John Wiley & Sons, 1981, p. 203.
Schwalm, Reinhold, "UV Coatings: Basics, Recent Developments and New Applications", Elsevier, Dec. 2006, p. 115.
Buchholz, Fredric L. , et al.—editors; Modern Superabsorbent Polymer Technologies; New York, Wiley & Sons Inc., published Nov. 11, 1997; copyright 1998; ISBN 0-471-19411-5; pp. 199-201; 4 pages.
Third Party Observation for Application No. EP20160923780 dated Jan. 9, 2020; 4 pages.

\* cited by examiner

SUPER ABSORBENT POLYMER AND METHOD FOR PRODUCING SAME

CROSS-REFERENCE TO RELATED APPLICATION(S)

This application is a national phase entry under 35 U.S.C. § 371 of International Application No. PCT/KR2016/015412, filed Dec. 28, 2016, which claims priority to Korean Patent Application No. 10-2016-0169386, filed Dec. 13, 2016, the disclosures of which are incorporated herein by reference.

TECHNICAL FIELD

The present invention relates to a super absorbent polymer having an excellent discoloration resistance characteristic even under high temperature/high humidity conditions, while maintaining excellent absorption performance, and a method for producing the same.

BACKGROUND ART

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. In such hygienic materials, the super absorbent polymer is generally contained in a stare of being spread in the pulp. In recent years, however, continuous efforts have been made to provide hygienic materials such as diapers having a thinner thickness. As a part of such efforts, the development of so-called pulpless diapers and the like in which the content of pulp is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to absorb liquid such as urine more efficiently, not only the super absorbent polymer needs to basically exhibit high absorption performance and absorption rate, but also it needs to exhibit more improved liquid permeability. That is, the super absorbent polymer should exhibit more improved liquid permeability, so the super absorbent polymer particles of the surface layer which first comes in contact with the liquid such as urine are absorbed and allow to absorb and pass the remaining liquid quickly. It becomes possible to absorb such remaining liquid effectively and quickly by the super absorbent polymer particles of the subsequent layer.

Accordingly, recently, various attempts have been made to develop more improved super absorbent polymer, but these technical requirements are not sufficiently satisfied yet.

Meanwhile, since the super absorbent polymer is contained in hygienic materials such as diaper, it is often exposed under high temperature/high humidity conditions. In this case, a phenomenon occurs in which the color turns yellow with the passage of time. This not only is desirable from an aesthetic point of view, but also causes a decrease in various physical properties of the super absorbent polymer.

Accordingly, there is a need to develop a super absorbent polymer having an excellent discoloration resistance characteristic even under high temperature/high humidity conditions, while maintaining excellent absorption performance.

DETAILED DESCRIPTION OF THE INVENTION

Technical Problem

It is one object of the present invention to provide a super absorbent polymer having an excellent discoloration resistance characteristic even under high temperature/high humidity conditions, and a method for producing the same.

Technical Solution

In order to achieve the above objects, the present invention provides a super absorbent polymer as follows:

the super absorbent polymer comprising:

a base polymer powder comprising a first cross-linked polymer of a water-soluble ethylenically unsaturated monomer having at least partially neutralized acidic groups; and a surface cross-linked layer formed on the base polymer powder and comprising a second cross-linked polymer in which the first cross-linked polymer is further cross-linked via a surface crosslinking agent, a sulfonate derivative and a sulfinate derivative, wherein a vortex time measured according to the measurement method of Vortex is 25 to 50 seconds, wherein an extractable content measured according to EDANA method No. WSP 270.2 is 15% by weight or less, wherein in a CIE 1976 colorimetric system, an L value is 90 or more and a b value is 8 or less, and wherein in a CIE 1976 colorimetric system measured after the super absorbent polymer is left under a condition of a temperature of 90° C. and a relative humidity of 90% for 48 hours, an L value is 80 or more and a b value is 9 or less.

The present invention also provides a super absorbent polymer as follows:

the super absorbent polymer comprising:

a base polymer powder comprising a first cross-linked polymer of a water-soluble ethylenically unsaturated monomer having at least partially neutralized acidic groups; and a surface cross-linked layer formed on the base polymer powder and comprising a second cross-linked polymer in which the first cross-linked polymer is further cross-linked via a surface crosslinking agent, wherein a vortex time measured according to the measurement method of Vortex is 25 to 50 seconds, wherein an extractable content measured according to EDANA method No. WSP 2702 is 15% by weight or less, wherein in a CIE 1976 colorimetric system, an L value is 90 or more and a b value is 8 or less, and wherein in a CIE 1976 colorimetric system measured after the super absorbent polymer is left under a condition of a temperature of 90° C. and a relative humidity of 90% for 48 hours, an L value is 80 or more and a b value is 9 or less.

As described above, the super absorbent polymer according to the present invention has features that it shows less discoloration according to CIE 1976 colorimetric system even under high temperature/high humidity conditions, in addition to the advantage that it has excellent vortex removal time and low extractable content. The above-described super absorbent polymer can be obtained by adjusting the surface crosslinking conditions of the super absorbent polymer as described below.

Hereinafter, embodiments of the present invention will be described in more detail.

Super Absorbent Resin

The water-soluble ethylenically unsaturated monomer constituting the first cross-linked polymer may be any monomer commonly used in the production of a super absorbent polymer. As a non-limiting example, the water-soluble ethylenically unsaturated monomer may be a compound represented by the following Chemical Formula 1:

$R_1$—COOM$^1$    [Chemical Formula 1]

in Chemical Formula 1, $R_1$ is an alkyl group having 2 to 5 carbon atoms containing an unsaturated bond, and $M^1$ is a hydrogen atom, a monovalent or divalent metal, an ammonium group or an organic amine salt.

Preferably, the above-described monomer may be at least one selected from the group consisting of acrylic acid, methacrylic acid, and a monovalent metal salt, a divalent metal salt, an ammonium salt, and an organic amine salt thereof. When acrylic acid or a salt thereof is used as the water-soluble ethylenically unsaturated monomer, it is advantageous in that a super absorbent polymer having improved absorption property can be obtained. In addition, as the monomer, maleic anhydride, fumaric acid, crotonic acid, itaconic acid, 2-acryloylethanesulfonic acid, 2-methacryloylethanesulfonic acid, 2-(meth)acryloylpropane sulfonic acid, or 2-(meth)acrylamido-2-methylpropane sulfonic acid, (meth)acrylamide, N-substituted (meth)acrylate, 2-hydroxyethyl (meth)acrylate, 2-hydroxypropyl(meth)acrylate, methoxypolyethylene glycol(meth)acrylate, polyethylene glycol (meth)acrylate, (N,N)-dimethylaminoethyl(meth)acrylate, (N,N)-dimethylaminopropyl(meth)acrylamide, and the like may be used.

Here, the water-soluble ethylenically unsaturated monomers may have an acidic group, wherein at least a part of the acidic group may be neutralized. Preferably, the monomers may be those partially neutralized with an alkali substance such as sodium hydroxide, potassium hydroxide, ammonium hydroxide, or the like.

In this case, a degree of neutralization of the monomer may be 40 to 95 mol %, or 40 to 80 mol %, or 45 to 75 mol %. The range of the degree of neutralization may vary depending on the final physical properties. An excessively high degree of neutralization causes the neutralized monomers to be precipitated, and thus polymerization may not readily occur, whereas an excessively low degree of neutralization not only greatly deteriorates the absorbency of the polymer, but also endows the polymer with hard-to-handle properties, such as those of an elastic rubber.

The second cross-linked polymer is obtained by additionally crosslinking the surface of the base polymer powder via a surface crosslinking agent. The surface crosslinking agent and the surface crosslinking method will be described later.

Meanwhile, the super absorbent polymer according to the present invention has a vortex time of 25 to 50 seconds as measured according to the measurement method of Vortex. The vortex time (absorption rate) means a time during which the vortex of the liquid disappears due to rapid absorption when the super absorbent polymer is added to the physiological saline solution and stirred. This can define a rapid water absorption capacity of the super absorbent polymer. The vortex time measured according to the measurement method of Vortex is 49 seconds or less, 48 seconds or less, 47 seconds or less, 46 seconds or less, or 45 seconds or less, and 26 seconds or more, 27 seconds or more, or 28 seconds or more. The measurement method of Vortex will be more specified in the following embodiments.

Further, in the super absorbent polymer according to the present invention, an extractable content measured according to EDANA method No. WSP 270.2 is 15% by weight or less. The extractable contents mainly occur when the polymer chains forming the network in the polymerization of the super absorbent polymer is short. The smaller the value of the extractable content is, the more excellent it is. Preferably, the extractable content measured according to EDANA method No. WSP 270.2 is 14% by weight or less, 13% by weight or less, 12% by weight or less, or 11% by weight. In addition, the lower the value of the extractable content is, the more excellent it is. The lower limit of the extractable content is theoretically 0% by weight, but as an example, it is 1% by weight or more, 2% by weight or more, 3% by weight or more, 4% by weight or more, or 5% by weight or more.

Further, the super absorbent polymer according to the present invention has an excellent discoloration resistance characteristic. Specifically, in a CIE 1976 colorimetric system of the super absorbent polymer according to the present invention, an L value is 90 or more and a b value is 8 or less. In a CIE 1976 colorimetric system measured after the super absorbent polymer is left under a condition of a temperature of 90° C. and a relative humidity of 90% for 48 hours, an L value is 80 or more and a b value is 9 or less.

In the CIE 1976 colorimetric system, the L value means a luminosity (value). If the L value is 0, it displays a back color, and if the L value is 100, it displays a white color. Therefore, in the present invention, the upper limit of the L value is 100, respectively. As described above, the L value of the super absorbent polymer according to the present invention is initially 90 or more, and even after being left for 48 hours under a condition of a temperature of 90° C. and a relative humidity of 90%, its value does not change significantly.

Specifically, the super absorbent polymer according to the present invention satisfies the following Mathematical Formula 1.

$\Delta L = (L_0 - L_1) \leq 7$    [Mathematical Formula 1]

in Mathematical Formula 1, $L_0$ is an L value in the CIE 1976 calorimetric system of the super absorbent polymer, and $L_1$ is an L value in the CIE 1976 colorimetric system measured after the super absorbent polymer is left under a condition of a temperature of 90° C. and a relative humidity of 90% for 48 hours.

As shown in Mathematical Formula 1, the super absorbent polymer according to the present invention has a change in L value of 7 or less even after being left for 48 hours under a condition of a temperature of 90° C. and a relative humidity of 90%, which is excellent in the discoloration resistance characteristic to such a degree that the change cannot be recognized with the naked eye. Preferably, in Mathematical Formula 1, $\Delta L$ is 6 or less, 5 or less, or 4 or less. In addition, the lower limit of ΔL is theoretically zero, but as an example, it may be 1 or more, 2 or more, or 3 or more.

Further, in the CIE 1976 colorimetric system, the b value means the degree of yellow-blue. If the b value is a negative number, it displays blue, and if the b value is a positive number, it displays yellow. The super absorbent polymer is yellowish as a whole. Thus, in the present invention, the lower limit of each b value is theoretically zero, and as an example, it is 1 or more, 2 or more, or 3 or more. As described above, the b value of the super absorbent polymer according to the present invention is initially 8 or less, and even after being left for 48 hours under a condition of a temperature of 90° C. and a relative humidity of 90%, its value does not change significantly.

Specifically, the super absorbent polymer according to the present invention satisfies the following Mathematical Formula 2.

$$\Delta b = (b_1 - b_0) \leq 3 \qquad \text{[Mathematical Formula 2]}$$

in Mathematical Formula 2, $b_0$ is a b value in a CIE 1976 colorimetric system of the super absorbent polymer, and $b_1$ is an L value in a CIE 1976 colorimetric system measured after the super absorbent polymer is left under a condition of a temperature of 90° C. and a relative humidity of 90% for 48 hours.

As shown in Mathematical Formula 2, the super absorbent polymer according to the present invention has a change in b value of 3 or less even after being left for 48 hours under a condition of a temperature of 90° C. and a relative humidity of 90%, which is excellent in the discoloration resistance characteristic to such a degree that the change cannot be recognized with the naked eye. Preferably, in Mathematical Formula 2, Δb is 2 or less, or 1 or less. Further, the lower limit of Δb is theoretically zero, but as an example, it is 0.1 or more, or 0.2 or more.

Further, preferably, the super absorbent polymer according to the present invention has a centrifuge retention capacity (CRC) for a physiological saline solution (0.9% by weight sodium chloride aqueous solution) for 30 minutes of 28 to 45 g/g or more. More preferably, the centrifuge retention capacity is 28.5 g/g or more, or 29.0 g/g or more, and 44 g/g or less, 43 g/g or less, or 42 g/g or less. The measurement method of the centrifuge retention capacity will be more specified in the following embodiments.

Further, preferably, the super absorbent polymer according to the present invention has an absorbency under pressure (0.3 AUP) at 0.3 psi for a physiological saline solution (0.9% by weight sodium chloride aqueous solution) of 20 to 33 g/g. More preferably, the 0.3 AUP is 21 g/g or more, 22 g/g or more, 23 g/g or more, 24 g/g or more, or 25 g/g or more.

Method for Producing Super Absorbent Polymer

The present invention provides a method for producing a super absorbent polymer, in which the method for producing a super absorbent polymer including the steps of:

crosslinking a water-soluble ethylenically unsaturated monomer having at least partially neutralized acidic groups in the presence of an internal crosslinking agent to form a hydrogel polymer containing a first crosslinked polymer (step 1);

drying, pulverizing and classifying the hydrogel polymer to form a base polymer power (step 2); and heat-treating and surface-crosslinking the base polymer powder in the presence of a surface crosslinking solution containing a surface crosslinking agent, a sulfinate derivative and a sulfonate derivative to form a super absorbent polymer particle (step 3).

Hereinafter, the above preparation method will be described in detail for each step.

(Step 1)

Step 1 is a step of forming a hydrogel polymer which is a step of crosslinking a monomer composition including an internal crosslinking agent and a water-soluble ethylenically unsaturated monomer having at least partially neutralized acidic groups.

In this case, the water-soluble ethylenically unsaturated monomer is as described above. Further, the concentration of the water-soluble ethylenically unsaturated monomer in the monomer composition may be appropriately adjusted in consideration of the polymerization time, the reaction conditions and the like, and it may be preferably 20 to 90% by weight, or 40 to 65% by weight. These concentration ranges may be advantageous for adjusting the pulverization efficiency during pulverization of the polymer described below, without needing to remove unreacted monomers after polymerization by using the phenomenon of gel effect occurring in the polymerization reaction of the highly concentrated aqueous solution. However, when the concentration of the monomer is excessively low, the yield of the super absorbent polymer can be lowered. Conversely, when the concentration of the monomer is excessively high, it may arise problems in the processes, for example, a part of the monomer may be precipitated, or the pulverization efficiency may be lowered during pulverization of the polymerized hydrogel polymer, etc., and the physical properties of the super absorbent polymer may be deteriorated.

Further, as the internal crosslinking agent, any compound can be used without particular limitation as long as it enables introduction of a crosslink bond upon polymerization of the water-soluble ethylenically unsaturated monomer. Non-limiting examples of the internal crosslinking agent may include multifunctional crosslinking agents, such as N,N'-methylenebisacrylamide, trimethylolpropane tri(meth)acrylate, ethylene glycol di(meth)acrylate, polyethylene glycol (meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof, but are not limited thereto.

Such internal crosslinking agent may be added at a concentration of about 0.001 to 1% by weight, based on the monomer composition. That is, if the concentration of the internal crosslinking agent is too low, the absorption rate of the polymer is lowered and the gel strength may become weak, which is undesirable. Conversely, if the concentration of the internal crosslinking agent is too high, the absorption capacity of the polymer is lowered and thereby is not preferred for an absorbent.

Further, in step 1, a polymerization initiator generally used in the production of a super absorbent polymer can be included. As a non-limiting example, as the polymerization initiator, a thermal polymerization initiator, a photo-polymerization initiator or the like may be used depending on the polymerization method. In particular, the thermal polymerization initiator can be used. However, even in the case of the photo-polymerization method, a certain amount of heat is generated by ultraviolet irradiation or the like, and a certain amount of heat is generated in accordance with the progress of the polymerization reaction, which is an exothermic reaction, and thus, a thermal polymerization initiator may further be included.

As the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like. In addition, examples of the azo-based initiator may include 2,2-azobis(2-amidinopropane)dihydrochloride, 2,2-azobis-(N,N-dimethylene) isobutyramidine dihydrochloride, 2-(2-(carbamoylazo) isobutylonitril, 2,2-azobis[2-(2-imidazolin-2-yl)propane] dihydrochloride, 4,4-azobis-(4-cyanovaleric acid), and the like. More various thermal polymerization initiators are well disclosed in "Principle of Polymerization" written by Odian, (Wiley, 1981), p 203, the content of which is incorporated herein by reference.

The photo-polymerization initiator used herein may include, for example, one or more compounds selected from the group consisting of benzoin ether, dialkyl acetophenone, hydroxyl alkylketone, phenyl glyoxylate, benzyl dimethyl ketal, acyl phosphine and α-aminoketone. Among them, as a specific example of the acylphosphine, a commonly used lucyrin TPO, that is, 2,4,6-trimethyl-benzoyl-trimethyl phosphine oxide may be used. More various photo-polymerization initiators are well disclosed in "UV Coatings: Basics, Recent Developments and New Application" written by Reinhold Schwalm, (Elsevier, 2007), p 115, the content of which is incorporated herein by reference.

The polymerization initiator may be added in a concentration of about 0.001 to 0.3% by weight based on the monomer composition. That is, when the concentration of the polymerization initiator is too low, the polymerization rate may become slow and a large amount of residual monomer may be extracted in the final product, which is not preferable. Conversely, when the concentration of the polymerization initiator is higher than the above range, the polymer chains constituting the network become short, and thus the extractable content is increased and physical properties of the polymer may deteriorate such as a reduction in absorbency under pressure, which is not preferable.

Further, the monomer composition may further include additives such as a foaming agent, a surfactant, a thickener, a plasticizer, a preservation stabilizer, an antioxidant, etc., if necessary.

The foaming agent acts to increase the surface area by causing foaming during polymerization to produce pores in the hydrogel polymer. As the foaming agent, a carbonate can be used. As an example, sodium bicarbonate, sodium carbonate, potassium bicarbonate, potassium carbonate, calcium bicarbonate, calcium carbonate, magnesiumbicarbonate or magnesium carbonate can be used.

Further, the foaming agent is preferably used in an amount of 0.3% by weight or less based on the weight of the water-soluble ethylenically unsaturated monomer. When the amount of the foaming agent used is more than 0.3% by weight, the pores become too large, the gel strength of the super absorbent polymer lowers and the density becomes low, which may cause problems in distribution and storage. Further, the foaming agent is preferably used in an amount of 0.05% by weight or more, based on the weight of the water-soluble ethylenically unsaturated monomer.

Further, the surfactant allows to induce uniform dispersion of the foaming agent to perform a uniform foaming when foaming, thereby preventing the gel strength from being lowered or the density being lowered. As the surfactant, it is preferable to use an anionic surfactant. Specifically, the surfactant includes $SO_3^-$ anion, and a compound represented by the following Chemical Formula 2 can be used.

  [Chemical Formula 2]

in Chemical Formula 2.

R is an alkyl having 8 to 16 carbon atoms.

Further, the surfactant is preferably used in an amount of 0.05% by weight or less based on the weight of the water-soluble ethylenically unsaturated monomer. When the amount of the surfactant used exceeds 0.05% by weight, the content of the surfactant in the super absorbent polymer increases, which is not preferable. Further, the surfactant is preferably used in an amount of 0.005% by weight or more, or 0.01% by weight or more, based on the weight of the water-soluble ethylenically unsaturated monomer.

In addition, such monomer composition may be prepared in the form of a solution in which a raw material such as the above-mentioned monomer, a polymerization initiator and an internal crosslinking agent is dissolved in a solvent.

In this case, any usable solvent can be used without limitation in the constitution as long as it can dissolve the above-mentioned raw material. Examples of the solvent may include water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof.

Further, the formation of the hydrogel polymer through polymerization of the monomer composition may be performed by a general polymerization method, and the process is not particularly limited. As a non-limiting example, the polymerization method are largely classified into a thermal polymerization and a photo-polymerization according to the type of the polymerization energy source, and the thermal polymerization may be carried out in a reactor like a kneader equipped with agitating spindles and the photo-polymerization may be carried out in a reactor equipped with a movable conveyor belt.

As an example, the monomer composition is injected into a reactor like a kneader equipped with the agitating spindles, and thermal polymerization is performed by providing hot air thereto or heating the reactor, thereby obtaining the hydrogel polymer. In this case, the hydrogel polymer, which is discharged from the outlet of the reactor according to the type of agitating spindles equipped in the reactor, may be obtained as particles with a size of centimeters or millimeters. Specifically, the hydrogel polymer may be obtained in various forms according to the concentration of the monomer composition injected thereto, the injection speed, or the like, and the hydrogel polymer having a (weight average) particle diameter of 2 to 50 mm may be generally obtained.

As another example, when the photo-polymerization of the monomer composition is performed in a reactor equipped with a movable conveyor belt, a sheet-shaped hydrogel polymer may be obtained. In this case, the thickness of the sheet may vary depending on the concentration of the monomer composition injected thereto and the injection speed, and the polymer sheet is preferably controlled to have typically a thickness of 0.5 to 5 cm in order to secure the production speed or the like while enabling a uniform polymerization of the entire sheet.

In this case, the hydrogel polymer obtained by the above-mentioned method may have a water content of 40 to 80% by weight. Meanwhile, the "water content" as used herein means a weight occupied by moisture with respect to a total weight of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the drying process by raising the temperature of the polymer through infrared heating. At this time, the drying conditions may be determined as follows: the drying temperature is increased from room temperature to about 180° C. and then the temperature may be maintained at 180° C., and the total drying time may be set to 20 minutes, including 5 minutes for the temperature rising step.

(Step 2)

Step 2 is a step of drying, pulverizing and classifying the hydrogel polymer to form a base polymer power, and the base polymer powder and the super absorbent polymer obtained therefrom are suitably prepared and provided so as to have a particle size of 150 to 850 μm. More preferably, at least 95% by weight of the base polymer powder and the super absorbent polymer obtained therefrom have a particle size of 150 to 850 μm, and fine powders having a particle size of less than 150 μm can be less than 3% by weight. As the particle size distribution of the base polymer powder and the super absorbent polymer is adjusted within the preferable range, the super absorbent polymer finally produced can already exhibit the above-mentioned physical properties more satisfactorily.

Meanwhile, the method of proceeding the drying, grinding and classifying will be described in more detail below.

First, when drying the hydrogel polymer, a step of coarse pulverization may be further carried out before drying in order to increase the efficiency of the drying step, if necessary. A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the coarse pulverizing step may be performed so that the hydrogel polymer has a particle size of about 2 mm to about 10 mm. Pulverizing the hydrogel polymer into a particle size of less than 2 mm is technically not easy due to a high water content of the hydrogel polymer, and a phenomenon of agglomeration may occur between the pulverized particles. Meanwhile, if the hydrogel polymer is pulverized into a particle size of larger than 10 mm, the effect of increasing the efficiency in the subsequent drying step may be insignificant.

The hydrogel polymer coarsely pulverized as above or immediately after polymerization without the coarsely pulverizing step is subjected to a drying step. At this time, the drying temperature may be 50 to 250° C. When the drying temperature is less than 50° C., it is likely that the drying time becomes too long or the physical properties of the super absorbent polymer finally formed is deteriorated. When the drying temperature is higher than 250° C., only the surface of the polymer is excessively dried, and thus fine powder may be generated during the subsequent pulverization process and the physical properties of the super absorbent polymer finally formed may be deteriorated. More preferably, the drying may be performed at a temperature of 150 to 200° C., and more preferably at a temperature of 160 to 190° C. Meanwhile, the drying step may be carried out for 20 minutes to 15 hours, in consideration of the process efficiency, but is not limited thereto.

In the drying step, any drying method may be selected and used without limitation in the constitution if it is a method commonly used in the relevant art. Specifically, the drying step may be carried out by a method such as hot air supply, infrared irradiation, microwave irradiation or ultraviolet irradiation. When the drying step as above is finished, the water content of the polymer may be 0.05 to 10% by weight.

Next, a step of pulverizing the dried polymer obtained through such a drying step is carried out.

The polymer powder obtained through the pulverizing step may have a particle diameter of 150 μm to 850 μm. Specific examples of a pulverizing device that can be used to pulverize into the above particle diameter may include a ball mill, a pin mill, a hammer mill, a screw mill, a roll mill, a disc mill, a jog mill or the like, but it is not limited to the above-described examples.

Further, in order to control the physical properties of the super absorbent polymer powder finally commercialized after the pulverization step, a separate step of classifying the polymer powder obtained after the pulverization depending on the particle diameter may be undergone. Preferably, a polymer having a particle diameter of 150 μm to 850 μm is classified and only the polymer powder having such a particle diameter is subjected to the surface crosslinking reaction described later and finally commercialized.

(Step 3)

Step 3 is a step of crosslinking the surface of the base polymer prepared in step 2, which is a step of heat-treating and surface-crosslinking the base polymer powder in the presence of a surface crosslinking solution containing a surface crosslinking agent, a sulfinate derivative and a sulfonate derivative to form a super absorbent polymer particle.

Here, the kind of the surface crosslinking agent contained in the surface crosslinking solution is not particularly limited. As a non-limiting example, the surface crosslinking agent may be at least one compound selected from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene carbonate, ethylene glycol, diethylene glycol, propylene glycol, triethylene glycol, tetraethylene glycol, propanediol, dipropylene glycol, polypropylene glycol, glycerin, polyglycerin, butanediol, heptanediol, hexanediol trimethylol propane, pentaerythritol, sorbitol, calcium hydroxide, magnesium hydroxide, aluminum hydroxide, iron hydroxide, calcium chloride, magnesium chloride, aluminum chloride, and iron chloride.

In this case, the content of the surface crosslinking agent may be properly controlled according to the type of the surface crosslinking agent or reaction conditions, and preferably, the content may be controlled to 0.001 to 5 parts by weight based on 100 parts by weight of the base polymer. If the content of the surface crosslinking agent is too low, surface modification may not be properly performed to deteriorate physical properties of the final super absorbent polymer. On the contrary, if the surface crosslinking agent is excessively used, excessive surface crosslinking reaction may occur, leading to deterioration in absorption capability of the super absorbent polymer, which is not preferable.

Further, the surface crosslinking solution contains a sulfinate derivative and a sulfonate derivative, and thus improve the discoloration resistance characteristic of the super absorbent polymer to be produced.

Preferably, the sulfinate derivative may be a compound represented by the following Chemical Formula 3:

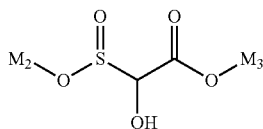

[Chemical Formula 3]

in Chemical Formula 3.

$M_2$ and $M_3$ are each independently hydrogen, Na, or K.

Preferably, the sulfonate derivative may be a compound represented by the following Chemical Formula 4:

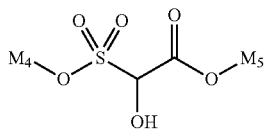

[Chemical Formula 4]

in Chemical Formula 4.

$M_4$ and $M_5$ are each independently hydrogen, Na, or K.

Preferably, the weight ratio of the sulfinate derivative and the sulfonate derivative is 1:2 to 1:10, more preferably 1:4 to 1:9. Further, the total content of the sulfinate derivative and the sulfonate derivative can be appropriately adjusted according to the kind thereof, the reaction conditions, and the like. Preferably, it can be adjusted to 0.001 to 5 parts by weight based on 100 parts by weight of the base polymer.

Further, the surface crosslinking solution may further include aluminum sulfate. The aluminum sulfate may be contained in an amount of 0.02 to 0.3 part by weight based on 100 parts by weight of the base polymer powder.

Further, the surface crosslinking solution may include fumed silica. The fumed silica may be contained in an amount of 0.01 to 0.5 parts by weight based on 100 parts by weight of the base polymer powder.

In addition, the surface crosslinking solution may further include at least one solvent selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide. The solvent may be included in an amount of 0.5 to 10 parts by weight based on 100 parts by weight of the base polymer.

In addition, the surface crosslinking solution may further include a thickener. If the surface of the base polymer powder is further crosslinked in the presence of the thickener, it is possible to minimize the deterioration of the physical properties even after the pulverization. Specifically, as the thickener, at least one selected from a polysaccharide and a hydroxy-containing polymer may be used. The polysaccharide may be a gum type thickener, a cellulose type thickener and the like. Specific examples of the gum type thickener include xanthan gum, arabic gum, karaya gum, tragacanth gum, ghatti gum, guar gum, locust bean gum, and psyllium seed gum. Specific examples of the cellulose type thickener include hydroxypropylmethyl cellulose, carboxymethyl cellulose, methylcellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, and methylhydroxypropyl cellulose. Meanwhile, specific examples of the hydroxy-containing polymer include polyethylene glycol, polyvinyl alcohol and the like.

Meanwhile, in order to perform the surface crosslinking, a method of placing the surface crosslinking solution and the base polymer into a reaction tank and mixing them, a method of spraying a surface crosslinking solution onto the base polymer, a method in which the base polymer and the surface crosslinking solution are continuously supplied in a continuously operating mixer and mixed, or the like can be used.

In addition, the surface crosslinking may be carried out at a temperature of 100 to 250° C., and may be continuously performed after the drying and pulverizing step proceeding at a relatively high temperature. At this time, the surface crosslinking reaction may be carried out for 1 to 120 minutes, or 1 to 100 minutes, or 10 to 60 minutes. That is, in order to prevent a reduction in physical properties due to damages of the polymer particles by excessive reaction while inducing the minimal surface crosslinking reaction, the surface modification step may be performed under the above-described conditions.

Advantageous Effects

As described above, the super absorbent polymer according to the present invention has an excellent discoloration resistance characteristic even under high temperature/high humidity conditions, while maintaining excellent absorption performance, and is preferably used for hygienic materials such as diapers, and thus can exhibit excellent performance.

DETAILED DESCRIPTION OF THE EMBODIMENTS

Hereinafter, preferred examples are provided for better understanding of the invention. However, these Examples are given for illustrative purposes only and are not intended to limit the scope of the present invention thereto.

Example 1

100 parts by weight of acrylic acid, 0.23 parts by weight of polyethylene glycol diacrylate (PEGDA; Mw=523) as a crosslinking agent, 0.25 parts by weight of sodium persulfate (SPS), 0.03 part by weight of sodium dodecylsulfonate (SDS), 0.08 part by weight of sodium bicarbonate (SBC), 83.3 parts by weight of a 50% caustic soda (NaOH) and 89.8 parts by weight of water were mixed to prepare a monomer aqueous solution.

810 g of the monomer aqueous solution was first mixed with 30.54 g of a 0.18% ascorbic acid solution and 33 g of a 1% sodium persulfate solution, and the mixture was fed through a feed section of a continuous polymerization reactor with a kneader, together with 30.45 g of a 0.15% hydrogen peroxide solution, so as to perform polymerization. At this time, the temperature of the polymerization reactor was maintained at 80° C., and the maximum polymerization temperature was 110° C. and the polymerization time was 1 min and 15 s. Thereafter, kneading was continuously performed, and polymerization and kneading were performed for 20 minutes. Thereafter, the size of the polymer produced was distributed to have 0.2 cm or less. At this time, the water content of the hydrogel polymer finally formed was 51% by weight.

Subsequently, the gel pulverization was performed by using Meat Chopper (SL Company, SM3-2) pulverizing device, and using a gel-pulverizing device in which an inverter for axis control (for example, manufacturer: LS Industrial Systems, model name: iG5A) was installed, and a perforated plate (an aperture ratio of 25%) having a diameter of 16 mm was installed. More specifically, the gel pulverization was performed by rotating the shaft at a speed of 60 Hz while passing the hydrogel polymer through a pulverizing device.

Subsequently, the resulting hydrogel polymer was dried in a hot-air dryer at a temperature of 185° C. for 35 minutes, and the dried hydrogel polymer was pulverized by the following method. 1 kg of the polymer powder thus pulverized was put in a classifier (Restsch, AS200) and classified with an amplitude of 1.5 mm into three mesh sizes (combination of classified meshes: #30/#50/#100), and respective classified particles (5%/80%/15%) were collected. A polymer having a particle size of about 150 µm to 850 µm was classified and obtained, and the base polymer powder was obtained by the above method.

Thereafter, based on 100 parts by weight of the base polymer powder, 2 parts by weight of water, 0.1 part by weight of ethylene glycol diglycidyl ether (EX810), 0.1 part by weight of aluminum sulfate (Al—S), 0.1 part by weight of fumed silica particles (Aerosil 200), and 0.05 part by weight of a discoloration-improving agent were mixed to form a surface treatment solution. At this time, the discoloration-improving agent contained 2-hydroxy-2-sulfinatoacetic acid disodium salt, and 2-hydroxy-2-sulfonato acetic acid disodium salt at a weight ratio of 1:9. Then, the surface treatment solution was sprayed onto the base polymer powder, stirred at room temperature, and mixed so that the surface treatment solution was evenly distributed on the base polymer powder. Thereafter, the base polymer powder was placed in a surface crosslinking reactor and the surface cross-linking reaction was performed. In the surface crosslinking reactor, it was confirmed that the base polymer powder was gradually heated at an initial temperature near 20° C., After 20 minutes elapsed, operation was performed so as to reach the maximum reaction temperature of 185° C. After reaching the maximum reaction temperature, additional reaction was carried out for 40 minutes, and then a sample of the finally produced super absorbent polymer was taken. After the surface crosslinking step, a surface cross-linked super absorbent polymer having a particle size of about 150 to 850 µm was obtained by using a sieve.

Examples 2 to 5

A super absorbent polymer was prepared in the same manner as in Example 1, except that the content of PEGDA, the content of SPS, and the composition of the surface crosslinking solution were set as shown in Table 1 below.

Comparative Examples 1 to 4

A super absorbent polymer was prepared in the same manner as in Example 1, except that the content of PEGDA and the content of SPS were set as shown in Table 1 below, and only 2-hydroxy-2-sulfonato acetic acid disodium salt was used as the discoloration-improving agent.

TABLE 1

| | | | Surface crosslinking solution (part by weight) | | |
| --- | --- | --- | --- | --- | --- |
| | PEGDA (ppmw) | SPS (ppmw) | Water | EX810 | Discoloration inhibitor |
| Ex. 1 | 2300 | 2500 | 2.0 | 0.1 | 0.05 |
| Ex. 2 | 2800 | 2000 | 2.5 | 0.1 | 0.05 |
| Ex. 3 | 2800 | 1500 | 2.0 | 0.1 | 0.05 |
| Ex. 4 | 2800 | 1500 | 2.0 | 0.1 | 0.15 |
| Ex. 5 | 3400 | 1000 | 2.0 | 0.1 | 0.05 |
| Comparative Ex. 1 | 3700 | 4000 | 4.0 | 0.15 | — |
| Comparative Ex. 2 | 3700 | 4000 | 4.0 | 0.15 | 0.05 |
| Comparative Ex. 3 | 4200 | 3500 | 2.0 | 0.1 | 0.05 |
| Comparative Ex. 4 | 3400 | 5000 | 2.0 | 0.1 | 0.05 |

Experimental Example: Evaluation of Physical Properties of Super Absorbent Polymer The physical properties of the super absorbent polymer prepared in Examples and Comparative Examples were evaluated by the following methods, and the results are shown in Table 2 below.

1) Centrifuge Retention Capacity (CRC)

The centrifuge retention capacity(CRC) by water absorption capacity under a non-loading condition was measured for the super absorbent polymers of Examples and Comparative Examples in accordance with EDANA (European Disposables and Nonwovens Association) method No. WSP 241.3.

Specifically, $W_0$ (g, about 0.2 g) of the super absorbent polymers of Examples and Comparative Examples were uniformly put in a nonwoven fabric-made bag, followed by sealing. Then, the bag was immersed in a physiological saline solution composed of 0.9 wt % aqueous sodium chloride solution at room temperature. After 30 minutes, water was removed from the bag by centrifugation at 250 G for 3 minutes, and the weight $W_2(g)$ of the bag was then measured. Further, the same procedure was carried out without using the super absorbent polymer, and then the resultant weight $W_1(g)$ was measured.

Using the respective weights thus obtained, CRC (gig) was calculated according to the following Mathematical Formula 3.

$$CRC(g/g) = \{[W_2(g) - W_1(g) - W_0(g)]/W_0(g)\} \qquad \text{[Mathematical Formula 3]}$$

in Mathematical Formula 3, $W_0(g)$ is an initial weight (g) of the super absorbent polymer, $W_1(g)$ is the weight of the device not including the super absorbent polymer, measured after immersing and absorbing the same into a physiological saline solution for 30 minutes and then dehydrating the same by using a centrifuge at 250G for 3 minutes, and $W_2(g)$ is the weight of the device including the super absorbent polymer, measured after immersing and absorbing the super absorbent polymer into a physiological saline solution at room temperature for 30 minutes and then dehydrating the same by using a centrifuge at 250G for 3 minutes.

Further, CRC (BR CRC) was measured for each base polymer prepared in the course of preparing Examples and Comparative Examples in the same manner as described above.

2) Vortex 50 mL of a 0.9% by weight NaCl solution was put in a 100 mL beaker, and then 2 g of each super absorbent polymer prepared in Examples and Comparative Examples was added thereto while stirring at 600 rpm using a stirrer. Then, the vortex time was calculated by measuring the amount of time until a vortex of the liquid caused by the stirring disappeared and a smooth surface was formed, and the result was shown as the vortex removal time.

3) Absorbency Under Pressure (AUP)

The absorbency under pressure (AUP) was measured in accordance with EDANA (European Disposables and Nonwovens Association) method No. WSP 242.3.

Specifically, a 400 mesh stainless screen was installed at the bottom of a plastic cylinder having an inner diameter of 60 mm. $W_0$(g, about 0.90 g) of the super absorbent polymers obtained in Examples and Comparative Examples were uniformly scattered on the stainless screen at a temperature of 23±2° C. of and a relative humidity of 45%. Then, a piston capable of providing a load of 0.3 psi uniformly was designed so that the outer diameter was slightly smaller than 60 mm and thus it could move freely up and down without any gap with the inner wall of the cylinder. At this time, the weight $W_3$(g) of the device was measured.

A glass filter having a diameter of 125 mm and a thickness of 5 mm was placed in a Petri dish having a diameter of 150 mm, and a physiological saline solution composed of 0.90 wt % sodium hydroxide aqueous solution was poured until the surface level became equal to the upper surface of the glass filter. Then, a sheet of filter paper having a diameter of 120 mm was placed on the glass filter. The measuring device was placed on the filter paper, so that the liquid was absorbed under load for one hour. After one hour, the measuring device was lifted and the weight $W_4$(g) was measured.

Using the respective weights thus obtained, AUP (g/g) was calculated according to the following [Mathematical Formula 4.

$$AUP(g/g)=[W_4(g)-W_3(g)]/W_0(g) \quad \text{[Mathematical Formula 4]}$$

in Mathematical Formula 4, $W_0$(g) is an initial weight (g) of the super absorbent polymer, $W_3$(g) is the total sum of a weight of the super absorbent polymer and a weight of the device capable of providing a load to the super absorbent polymer, and $W_4$(g) is the total sum of a weight of the super absorbent polymer and a weight of the device capable of providing a load to the super absorbent polymer, after absorbing a physiological saline solution to the super absorbent polymer under a load (0.3 psi) for 1 hour.

4) Extractable Contents (16 hr E/C)

The extractable contents were measured by the same method as described in EDANA (European Disposables and Nonwovens Association) method No. WSP 270.2.

Specifically, 1.0 g of the super absorbent polymer was placed in 200 g of a 0.9 wt % NaCl solution, and then swollen while stirring at 500 rpm for 16 hours, followed by filtering out the aqueous solution with a filter paper. The filtered solution was first titrated to pH 10.0 with 0.1 N caustic soda solution, and then back-titrated to pH 2.7 with a 0.1 N hydrogen chloride solution. From the amount required during neutralization, the extractable content in the non-crosslinked polymer substance was calculated and measured.

5) CIE 1976 Colorimetric System

The L, a, and b values in the CIE 1976 calorimetric system of the super absorbent polymers of Examples and Comparative Examples were measured using LabScan XE manufactured by HunterLab.

Specifically, the reflection measurement was selected as the setting condition for the measurement, a container for powder/paste sample having an inner diameter of 30 mm and a height of 12 mm was used, a standard round white plate No. 2 for powder/paste was used as a standard, and a 30φ projecting pipe was used. The container for the prepared sample was filled with about 5 g of the super absorbent polymer. This charging was performed so as to charge about 60% of the container for the prepared sample. The L, a and b values were measured with a spectral color difference meter at room temperature and relative humidity of 50%, and for classification, these values are respectively shown as $L_0$, $a_0$ and $b_0$ in Table 2 below.

Subsequently, the container for the prepared sample was filled with about 5 g of superabsorbent resin, and the container was placed in a thermohygrostat for 48 hours at 90° C. and relative humidity of 90%. The L, a and b values were measured by the spectral color difference meter, and are shown in Table 2 as $L_1$, $a_1$ and $b_1$, respectively, for classification.

In addition, ΔL is calculated by the value of ($L_0$–$L_1$), and Δb is calculated by the value of ($b_1$–$b_0$). They are shown in Table 2 below.

TABLE 2

| | BR | | | | | CIE 1976 colorimetric system | | | | | | | |
| | CRC | CRC | Vortex | AUP | 16 hr | Before discloration | | | After discloration | | | | |
| | (g/g) | (g/g) | (sec) | (g/g) | (wt %) | $L_0$ | $a_0$ | $b_0$ | $L_1$ | $a_1$ | $b_1$ | ΔL | Δb |
|---|---|---|---|---|---|---|---|---|---|---|---|---|---|
| Ex. 1 | 44.3 | 41.1 | 29 | 30.1 | 14.1 | 92.1 | −0.9 | 6.1 | 85.6 | 0.3 | 8.5 | 6.5 | 2.4 |
| Ex. 2 | 42.1 | 39.2 | 35 | 28.1 | 13.3 | 91.8 | −0.9 | 5.8 | 86.6 | −0.1 | 7.1 | 5.2 | 1.3 |
| Ex. 3 | 39.3 | 38.6 | 37 | 28.5 | 12.1 | 92.3 | −1.0 | 5.3 | 86.3 | −0.2 | 6.1 | 6.0 | 0.8 |
| Ex. 4 | 37.0 | 32.1 | 45 | 27.9 | 12.1 | 92.3 | −1.0 | 5.3 | 86.3 | −0.2 | 5.8 | 6.0 | 0.5 |
| Ex. 5 | 35.5 | 29.3 | 44 | 29.1 | 10.3 | 92.3 | −1.1 | 5.1 | 89.2 | −0.4 | 5.3 | 3.1 | 0.2 |
| Comp. Ex. 1 | 35.1 | 30.2 | 39 | 30.1 | 20.6 | 91.1 | −0.8 | 6.7 | 78.3 | 2.7 | 12.6 | 12.8 | 5.9 |
| Comp. Ex. 2 | 35.1 | 30.1 | 43 | 29.7 | 21.2 | 91.6 | −0.7 | 7.0 | 81.2 | 0.8 | 10.8 | 10.4 | 3.8 |
| Comp. Ex. 3 | 34.3 | 29.8 | 39 | 30.8 | 18.3 | 92.1 | −0.9 | 6.1 | 82.1 | 0.3 | 10.4 | 10.0 | 4.3 |
| Comp. Ex. 4 | 33.8 | 29.1 | 35 | 28.5 | 25.1 | 92.1 | −0.9 | 6.1 | 78.1 | 0.3 | 12.5 | 14.0 | 6.4 |

As shown in Table 2, it was confirmed that not only the super absorbent polymers of Examples exhibited absorption performance (CRC and AUP) equal to or higher than that of Comparative Examples, but also they had excellent absorption rate (vortex removal time) and low extractable content, and especially exhibited less change in discoloration under high temperature/high humidity conditions.

The invention claimed is:

1. A super absorbent polymer comprising:
a base polymer powder comprising a first cross-linked polymer of a water-soluble ethylenically unsaturated monomer having at least partially neutralized acidic groups; and
a surface cross-linked layer formed on the base polymer powder and comprising a second cross-linked polymer in which the first cross-linked polymer is further cross-linked via a surface crosslinking agent, a sulfonate derivative and a sulfinate derivative,
wherein a weight ratio of the sulfinate derivative and the sulfonate derivative is 1:2 to 1:10, wherein the sulfinate derivative is 2 hydroxy-2-sulfinatoacetic acid disodium salt and the sulfonate derivative is 2-hydroxy-2-sulfonato acetic acid disodium salt,
wherein a vortex time measured according to the measurement method of Vortex is 25 to 50 seconds,
wherein an extractable content measured according to EDANA method No. WSP 270.2 is 15% by weight or less,
wherein in a CIE 1976 colorimetric system, an L value is 90 or more and a b value is 8 or less, and
wherein in a CIE 1976 colorimetric system measured after the super absorbent polymer is left under a condition of a temperature of 90° C. and a relative humidity of 90% for 48 hours, an L value is 80 or more and a b value is 9 or less.

2. The super absorbent polymer of claim 1, wherein the super absorbent polymer has a centrifuge retention capacity (CRC) for a physiological saline solution (0.9% by weight sodium chloride aqueous solution) for 30 minutes of 28 to 45 g/g or more.

3. The super absorbent polymer of claim 1, wherein the super absorbent polymer has an absorbency under pressure (0.3 AUP) at 0.3 psi for a physiological saline solution (0.9% by weight sodium chloride aqueous solution) of 20 to 33 g/g.

4. The super absorbent polymer of claim 1, wherein the super absorbent polymer satisfies the following Mathematical Formula 1:

$$\Delta L = (L_0 - L_1) \leq 7 \qquad \text{[Mathematical Formula 1]}$$

in Mathematical Formula 1,
$L_0$ is an L value in a CIE 1976 colorimetric system of the super absorbent polymer, and
$L_1$ is an L value in a CIE 1976 colorimetric system measured after the super absorbent polymer is left under a condition of a temperature of 90° C. and a relative humidity of 90% for 48 hours.

5. The super absorbent polymer of claim 1, wherein the super absorbent polymer satisfies the following Mathematical Formula 2:

$$\Delta b = (b_1 - b_0) \leq 3 \qquad \text{[Mathematical Formula 2]}$$

in Mathematical Formula 2,
$b_0$ is a b value in a CIE 1976 colorimetric system of the super absorbent polymer, and
$b_1$ is an L value in a CIE 1976 colorimetric system measured after the super absorbent polymer is left under a condition of a temperature of 90° C. and a relative humidity of 90% for 48 hours.

6. A method for producing the super absorbent polymer of claim 1 comprising:
crosslinking a water-soluble ethylenically unsaturated monomer having at least partially neutralized acidic groups in the presence of an internal crosslinking agent to form a hydrogel polymer containing a first cross-linked polymer;
drying, pulverizing and classifying the hydrogel polymer to form a base polymer power; and
heat-treating and surface-crosslinking the base polymer powder in the presence of a surface crosslinking solution comprising a surface crosslinking agent, a sulfinate derivative and a sulfonate derivative to form a super absorbent polymer particle,
wherein a weight ratio of the sulfinate derivative and the sulfonate derivate is 1:2 to 1:10, and
wherein the sulfinate derivative is 2 hydroxy-2-sulfinatoacetic acid disodium salt and the sulfonate derivative is 2-hydroxy-2-sulfonato acetic acid disodium salt.

7. The method of claim 6, wherein the crosslinking is carried out in the presence of a thermal polymerization initiator.

8. The method of claim 7, wherein the thermal polymerization initiator is used in an amount of 0.3% by weight or less based on the weight of the water-soluble ethylenically unsaturated monomer.

* * * * *